Oct. 13, 1925.
A. H. HAWLEY
1,557,457
ACCOUNTING MACHINE AND MOTOR DRIVE MECHANISM
Original Filed Sept. 11, 1917    10 Sheets-Sheet 1
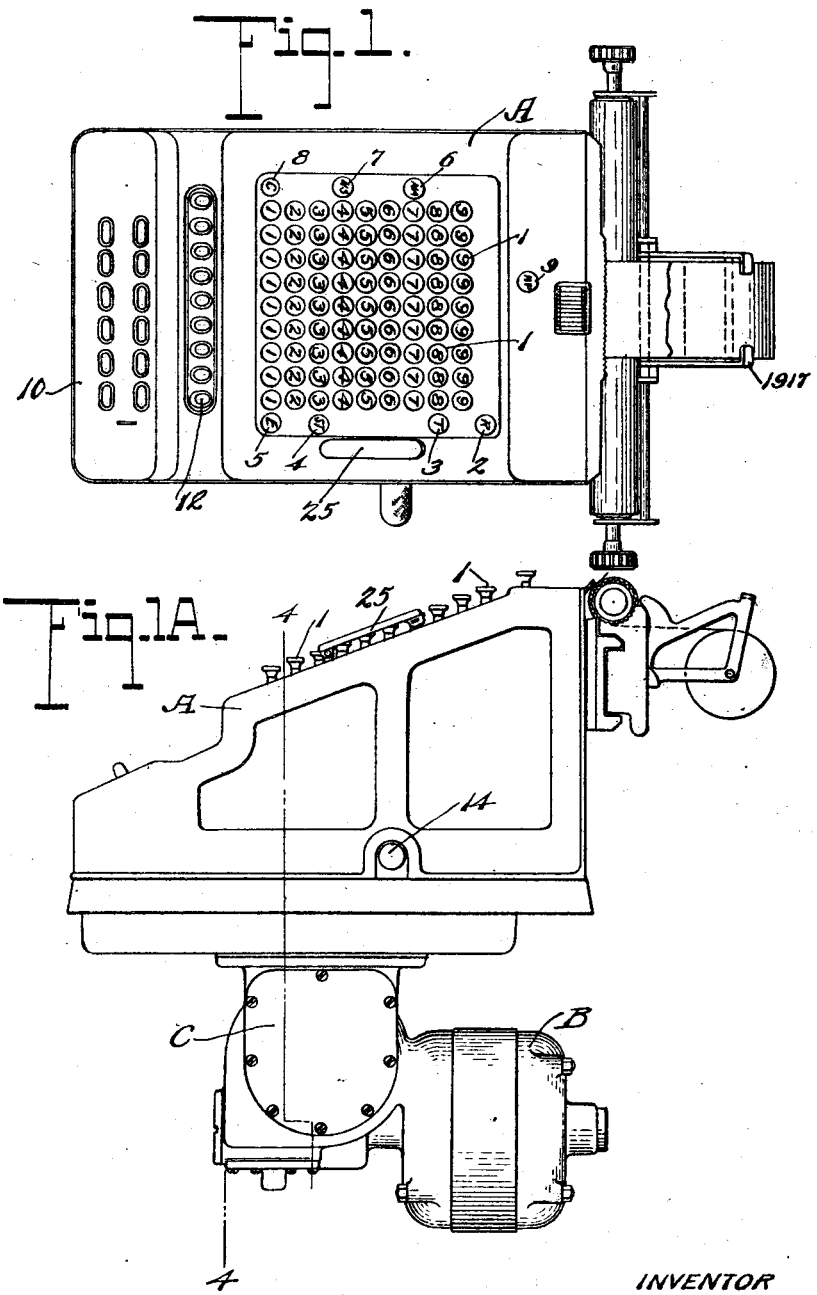

Oct. 13 1925.  
A. H. HAWLEY  
1,557,457  
ACCOUNTING MACHINE AND MOTOR DRIVE MECHANISM  
Original Filed Sept. 11, 1917　10 Sheets-Sheet 2
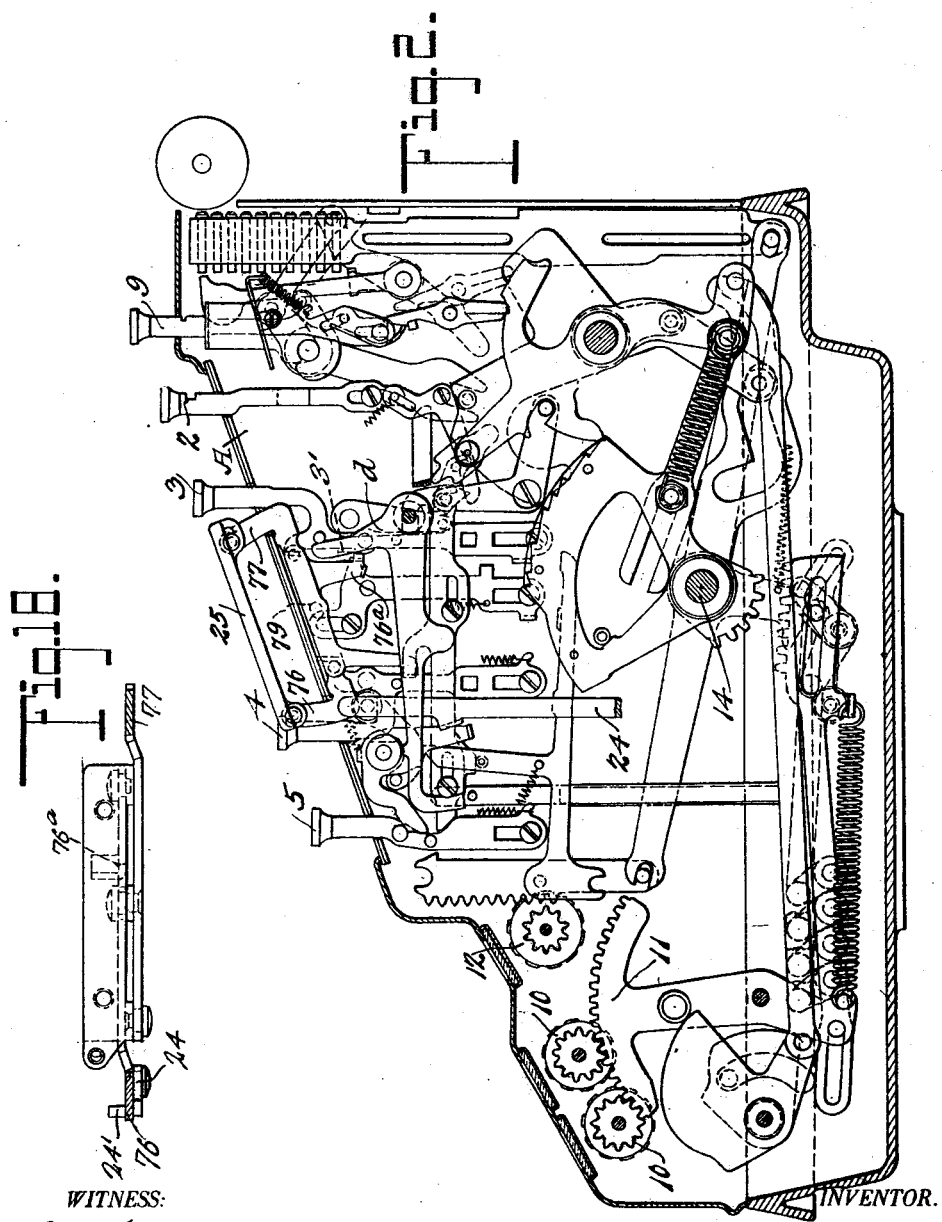
WITNESS:  
*C.H.Wagner.*
INVENTOR.  
*A.H.Hawley*  
BY   
ATTORNEY.

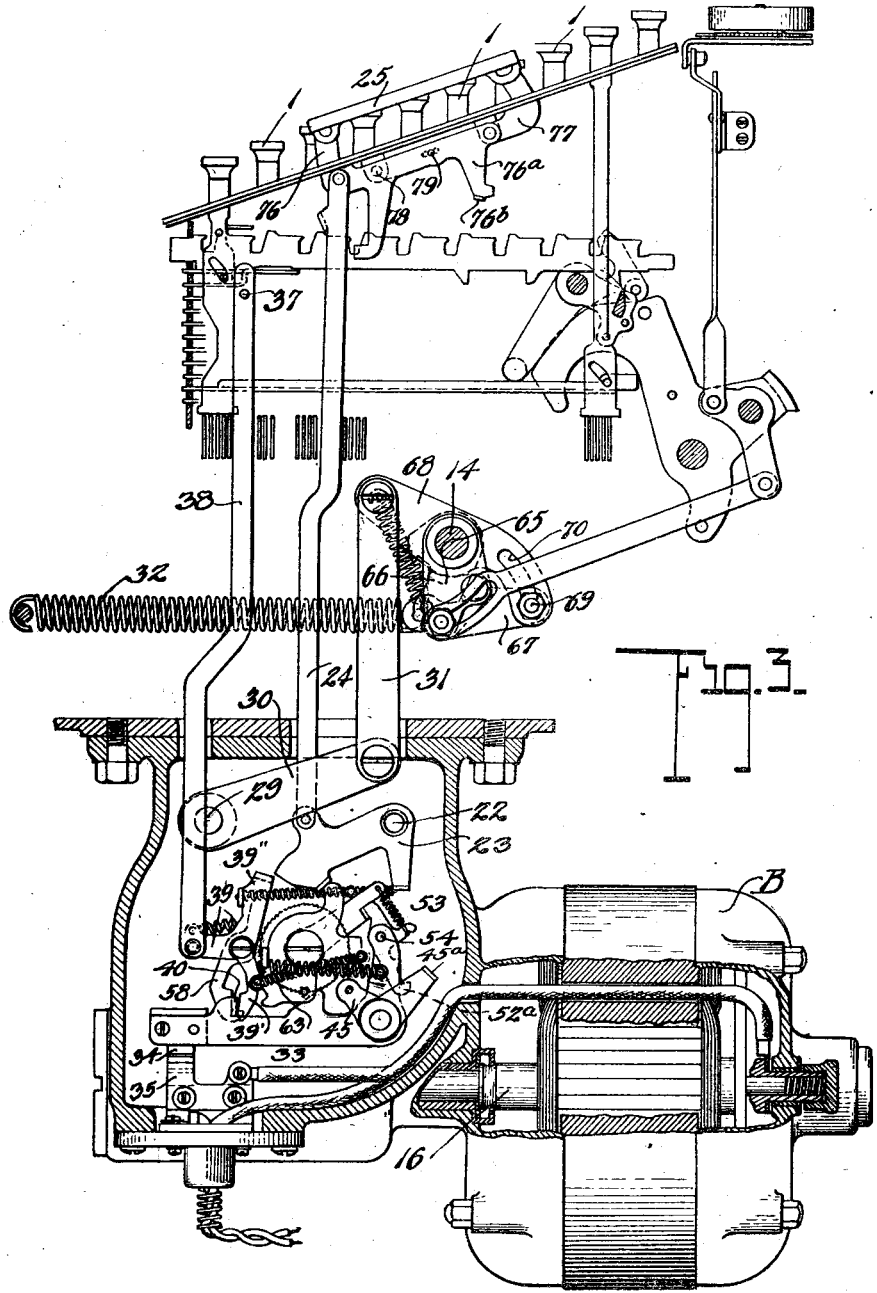

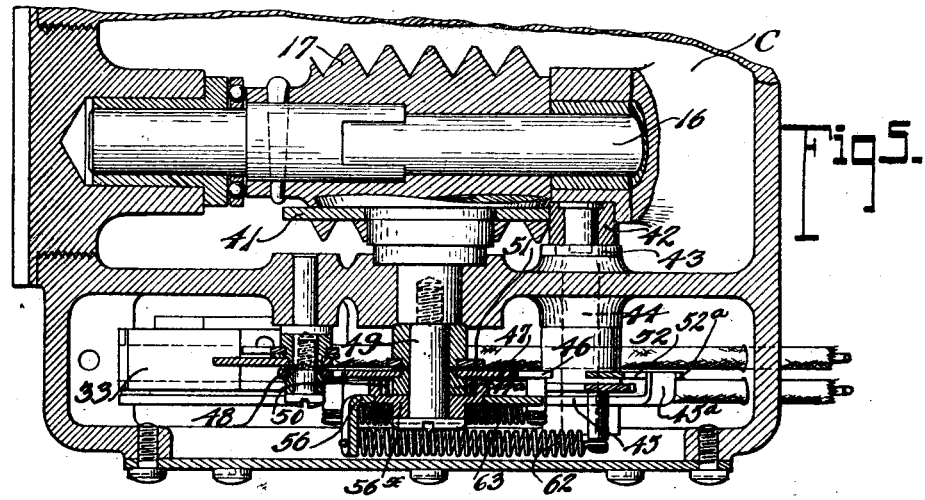

Oct. 13, 1925. 1,557,457
A. H. HAWLEY
ACCOUNTING MACHINE AND MOTOR DRIVE MECHANISM
Original Filed Sept. 11, 1917 10 Sheets-Sheet 6
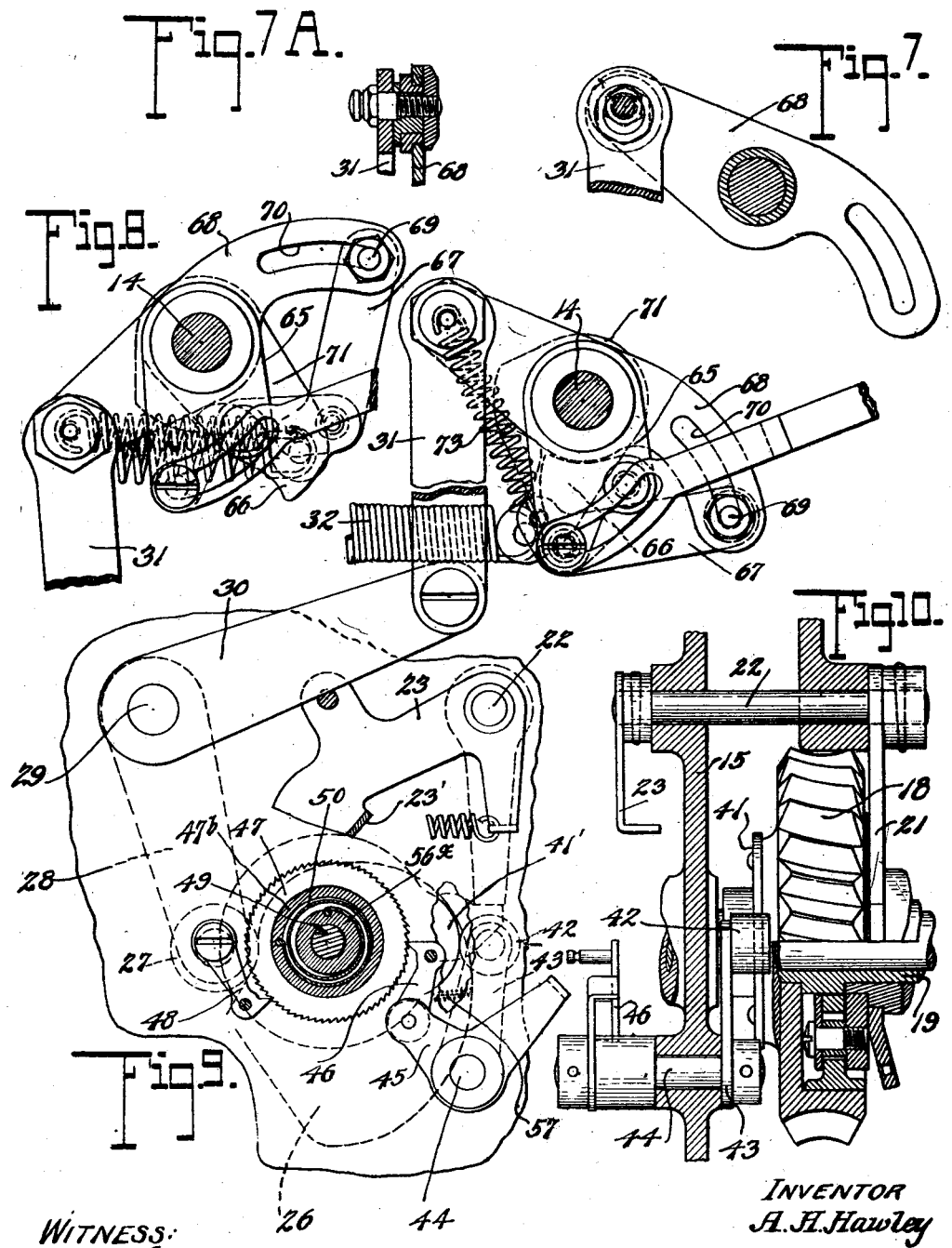
INVENTOR
A. H. Hawley
WITNESS:
C. H. Wagner
By 
ATTORNEY Oct. 13, 1925.                                                1,557,457
                        A. H. HAWLEY
         ACCOUNTING MACHINE AND MOTOR DRIVE MECHANISM
         Original Filed Sept. 11, 1917    10 Sheets-Sheet 7
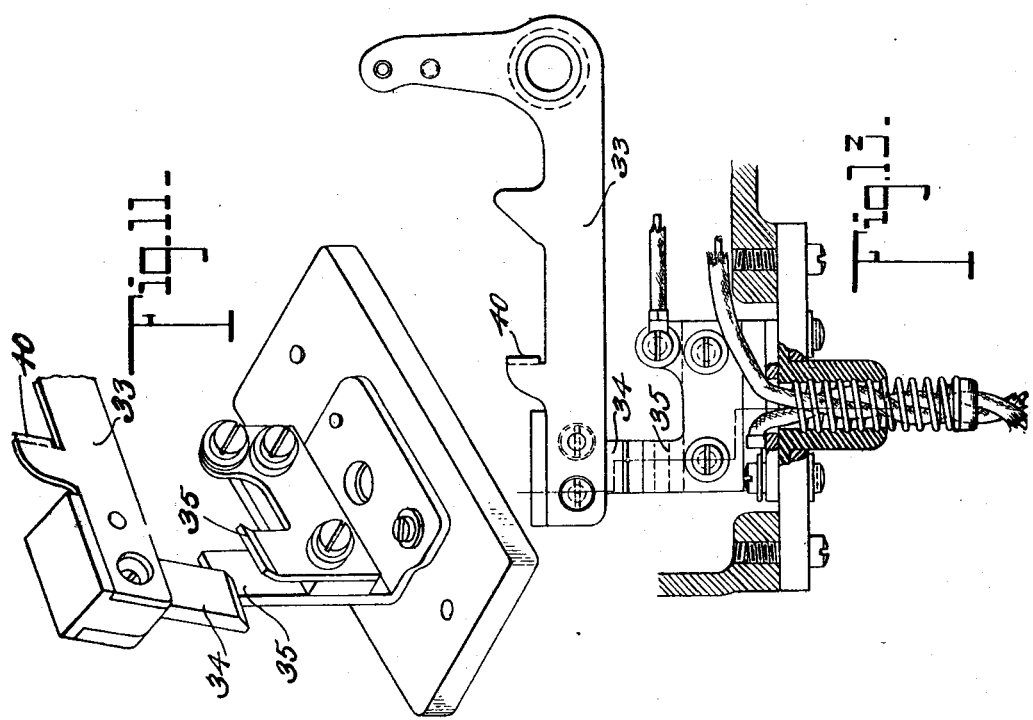
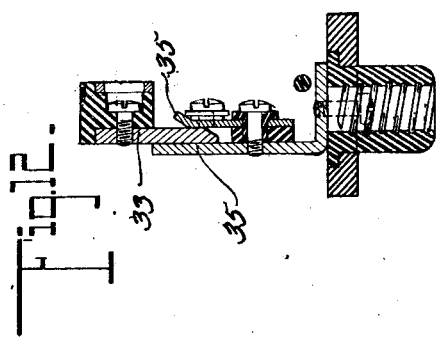
WITNESS
C.H.Wagner.
INVENTOR
A.H.Hawley
By J.W.Robb
        ATTORNEY Oct. 13, 1925.  
A. H. HAWLEY  
1,557,457  
ACCOUNTING MACHINE AND MOTOR DRIVE MECHANISM  
Original Filed Sept. 11, 1917  10 Sheets-Sheet 8

WITNESS:  
C.H.Wagner.

INVENTOR  
A.H.Hawley  
By J.W.Cobb  
ATTORNEY

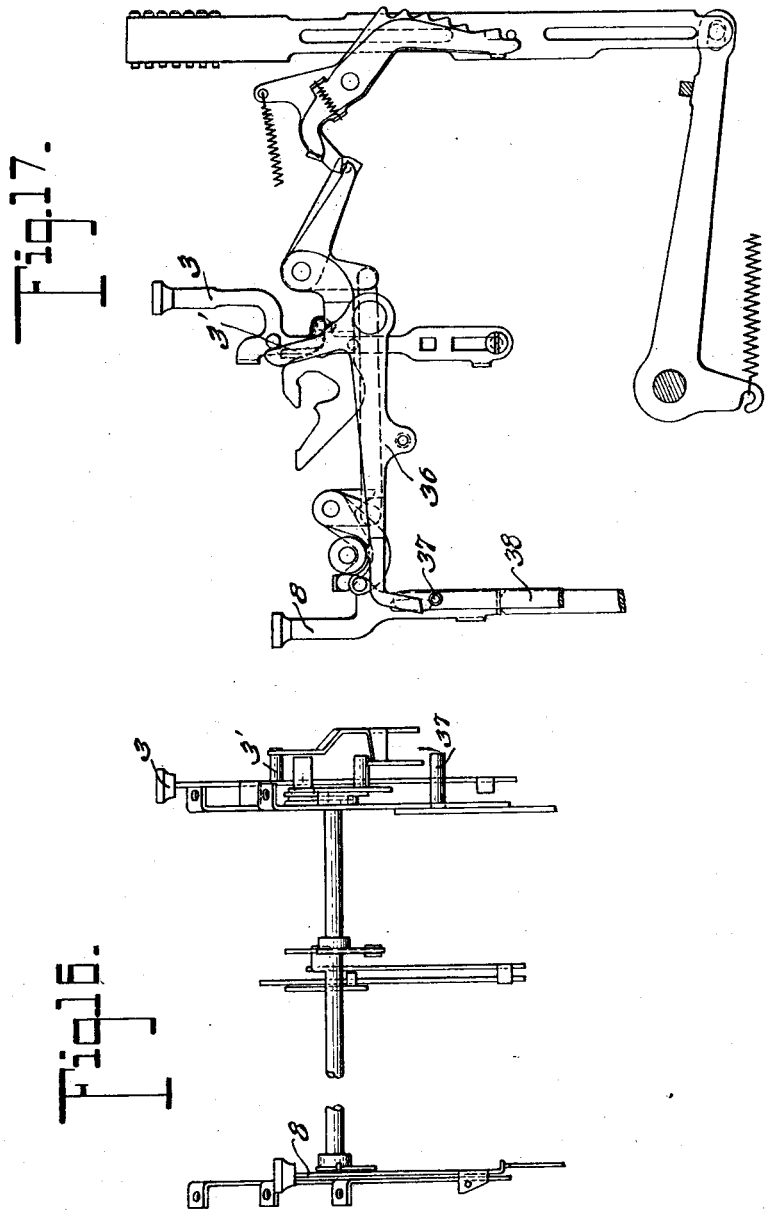

Oct. 13, 1925. 1,557,457
A. H. HAWLEY
ACCOUNTING MACHINE AND MOTOR DRIVE MECHANISM
Original Filed Sept. 11, 1917 10 Sheets-Sheet 10

Patented Oct. 13, 1925.

1,557,457

UNITED STATES PATENT OFFICE.

AMOS H. HAWLEY, OF NORWOOD, OHIO, ASSIGNOR TO REMINGTON ARMS COMPANY, INC., OF NEW YORK, N. Y., A CORPORATION OF DELAWARE.

ACCOUNTING MACHINE AND MOTOR-DRIVE MECHANISM.

Application filed September 11, 1917, Serial No. 190,801. Renewed March 25, 1925.

*To all whom it may concern:*

Be it known that I, AMOS H. HAWLEY, a citizen of the United States, residing at Norwood, in the county of Hamilton and State of Ohio, have invented certain new and useful Improvements in Accounting Machines and Motor-Drive Mechanism, of which the following is a specification.

The present invention involves primarily the reorganization of the controlling devices of an accounting machine with a view to the operation of such machines by motor drive mechanism, instead of by the commonly used manual crank handle.

One of the most important features of the improvements of this invention includes the provision of a starting means for the motor by which the accounting machine is driven, which starting means is so constituted as to compel a clearing operation of the accounting machine instrumentalities as an incident to the first actuation of the accounting machine subsequent to the commencement of operation of the moor drive mechanism. The purpose of the particular control just referred to will be evident when it is borne in mind that it is highly desirable to provide for all accounting machines some means which will insure the commencement of use of the machine only when the accumulating or equivalent mechanisms thereof are in a cleared or zeroized condition. By the present invention the clearing of the accounting machine is not dependent merely upon the memory or forethought of the operator.

The present invention involves additionally special provisions by which motor drive mechanism is adapted for operation of an accounting machine comprising mechanism for denominationalizing accounting items set up in the machine, the denominationalizing action embodying a divisional process, as for instance the dividing of an amount up into the smallest number of denominations of money required to make up such amount according to a predetermined monetary system.

Among other objects of the invention are certain provisions including especially certain novel automatic means adapted to control the stopping of the motor by opening of its controlling switch when the motor has continued in operation for a predetermined length of time without any transactions being set up upon the accounting machine; the provision of peculiar and new control mechanism for clutch means by which the motor is adapted to be operatively connected with the accounting machine for driving the latter; the provision ancillary to the foregoing mechanisms of means whereby the clutch controller coacts with the automatic means for stopping the motor to negative or prevent effective operation of the latter as an incident to the actuation of the clutch controller which takes place each time a transaction is entered upon the accounting machine, it being obvious that it is not desirable for the automatic stopping means to come into play when the accounting machine is being regularly used.

According to the present improvements provision is also made whereby a single operating member or key is utilized as the common device for starting the motor and for causing clearing action of the accounting machine, together with a special arrangement of characterizing means forming a part of the listing mechanism of the accounting machine whereby a character will be printed upon the listing tape to indicate the clear condition of the machine incident to its first operation after the motor has been started. By the last mentioned means a proper clearing of the machine preliminary to the introduction of items therein is not only insured but indicated.

With the above and other objects in view the details of the invention will now be set forth in connection with the accompanying drawings, in which—

Figure 1 is a top plan view of an accounting machine embodying the invention;

Figure 1ᴬ is a side elevation of said machine illustrating clearly the motor drive sections suspended from the base of the machine;

Figure 2 is a vertical sectional view bringing out more fully the arrangement of the accumulating, denominationalizing and listing mechanisms, certain of the special keys and the means whereby the clutch bar and special keys are locked against simultaneous manipulation;

Figure 3 is a sectional elevation taken about on the line 3—3 of Figure 4 and bringing out primarily the arrangement of the switch control mechanism, the safety connection between the motor and the prime mover of the accounting machine proper, and other details;

Figure 5 is a horizontal sectional view through the drive casing and taken about on the line 5—5 of Figure 4;

Figure 6 is a sectional elevation taken about on the line 6—6 of Figure 4, showing the disposition of the switch when in open position, the parts being at normal;

Figure 14:
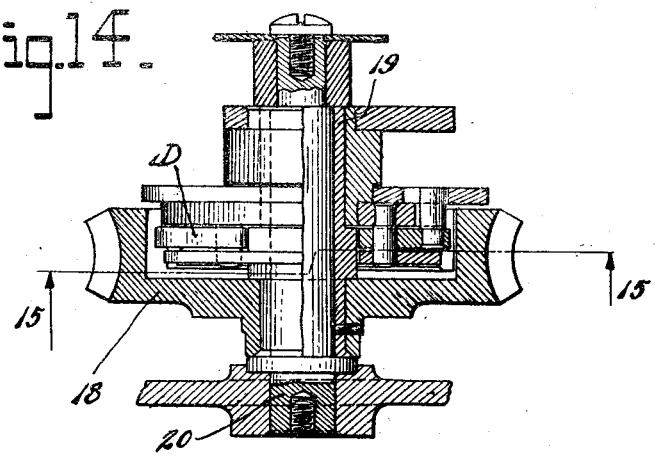
Figure 15:
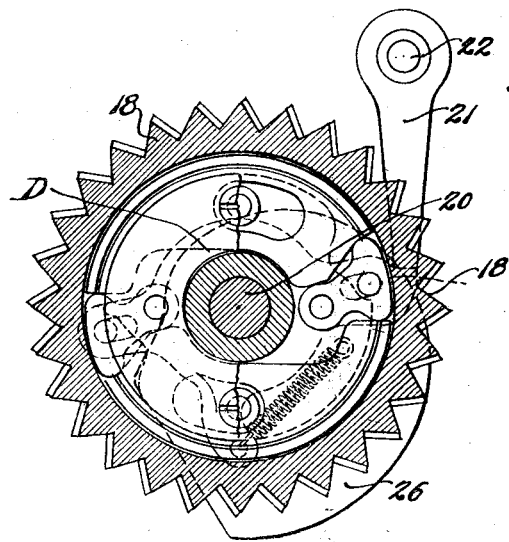

Figures 7 and 7^A are detail views of the adjustable connection between the motor drive mechanism and the accounting machine;

Figure 8 is a detail view showing the safety connection between the motor and the accounting machine, the parts being arranged at the extreme of operating movement, in abnormal positions as when for some reason or other the accounting machine devices fail to operate under the actuation of the motor drive mechanism;

Figure 9 is an enlarged view showing the parts shown in Figure 8 at normal and also illustrating more fully the timing devices for automatically controlling the switch;

Figure 10 is a fragmentary sectional view showing more fully the arrangement of the worm drive mechanism clutch and associated parts;

Figures 11, 12 and 13 are perspective, sectional and elevation views, respectively, bringing out fully the construction of the knife switch controlling the operation of the motor;

Figures 14 and 15 are horizontal and vertical sectional views showing the clutch devices particularly, Figure 15 being taken about on the line 15—15 of Figure 14.

Figure 19:
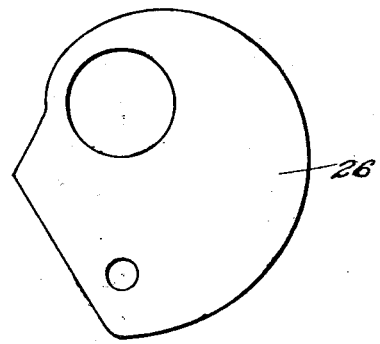
Figure 20:
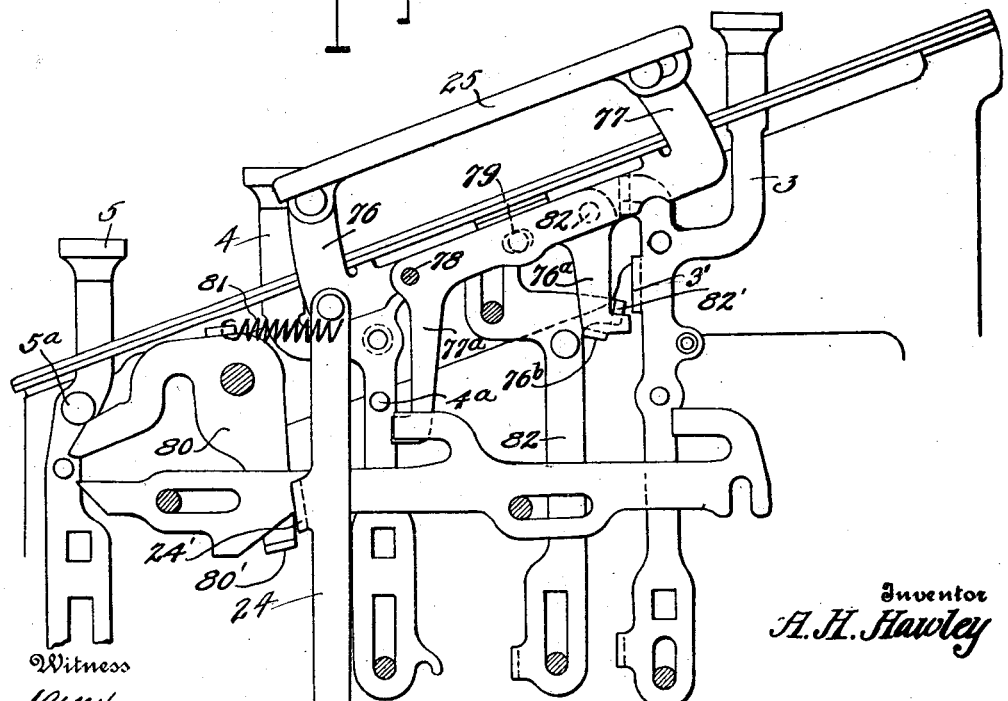

Figures 16 and 17 are detached detail views bringing out more clearly the error and total key connections and means for adjusting the special type carrier for special characterizing printing operations;

Figure 18 is a detailed sectional view showing more fully the supporting means for the clutch bar;

Figure 19 is a detail view of the actuating cam forming a part of the driving connection between the motor and the accounting machine main shaft;

Figure 20 is a detached view taken sectionally through the keyboard and bringing out more clearly the interlocking means intermediate the error, sub-total and total keys and the clutch controller.

*General features of accounting machine.*

Referring particularly to Figures 1, 1^A and 2, it may be noted that the accounting machine illustrated is that known as the International adding and denominationalizing machine and embodies the construction the details of which are generally disclosed in United States patent to White No. 1,192,721 issued July 25, 1916, and also disclosed in United States patent to Mann and Hawley No. 1,298,751. The improvements hereinafter set forth involve primarily the conversion of the machines of the said patent and application from a handle operated machine into the motor or power-driven type. The accounting machine embodies the casing A enclosing the main accounting mechanisms, suitable provisions in the form of amount keys 1 and special keys 2, 3, 4, 5, 6, 7, 8 and 9 being had. The said special keys 2 to 9 inclusive are respectively for repeat, totaling, sub-totaling, correction, non-adding, non-scheduling, clearing, and non-printing or non-listing control operations, respectively.

As seen in Figure 2 there is located at the front of the machine the denominationalizing mechanism comprising the denominational counters 10 with which cooperate peculiar selecting mechanism not shown, and also the clearing sectors 11, these detail features not being a part of the present invention but fully presented in the application previously identified. The accumulator of the adding machine is located between the keyboard and the denominational counters 10 and comprises the adding wheels 12 seen best in Figure 2 also.

As shown in Figure 1^A, the motor B is disposed beneath the accounting machine A and may be of any conventional type of A. C. or D. C. electric motor, the casing of said motor being associated with the casing C suspended by suitable fastenings from the under side or base of the accounting machine A, said casing C containing certain of the driving connections between the motor and the accounting machine, as well as the controlling switch and timing devices to be hereafter described.

The amount keys 1 of the keyboard of the accounting machine will operate in the customary manner to index amounts to be accumulated or listed or denominationalized, the said operations or one of them taking place as an incident to the actuation of the main shaft 14 of the accounting machine.

*Motor drive connections.*

Figure 4:
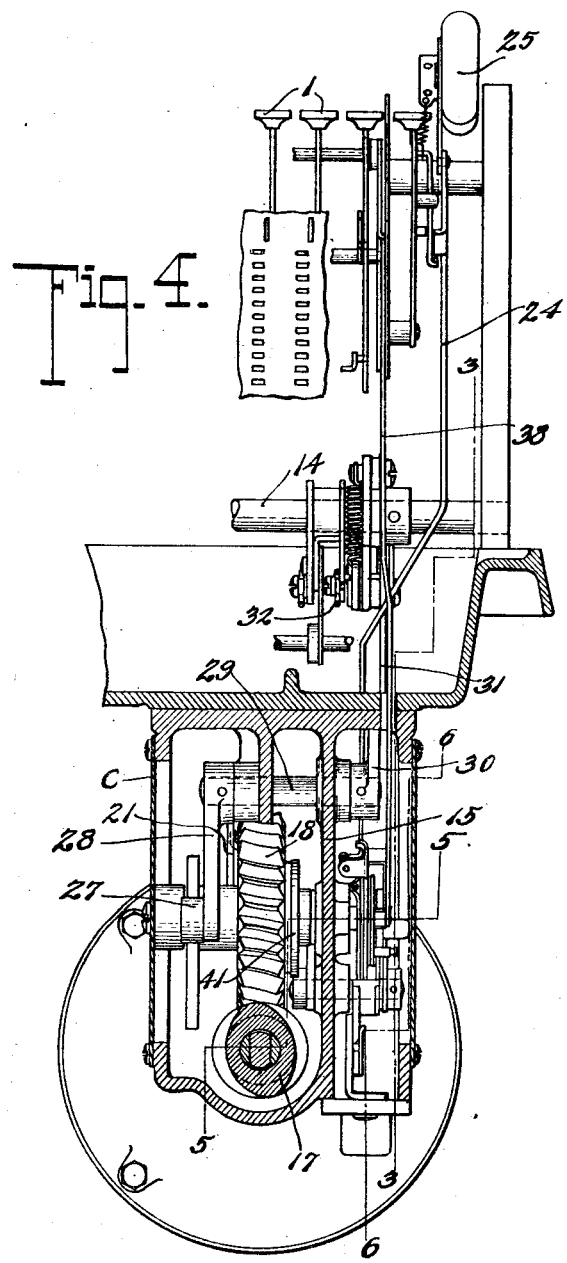
Figure 4 is a vertical section taken about on the line 4—4 of Figure 1^A and looking from the front of the machine.

As seen best in Figure 4, the casing C is divided by a vertical partition 15 into two compartments in one of which the motor shaft 16 enters, see Figure 3, said shaft being equipped with a worm 17 engaging a worm wheel 18, all arranged in said compartment. Certain clutch mechanism illustrated in Figures 14 and 15 at D is utilized to connect the worm wheel 18 operatively to a sleeve 19 carried by a spindle 20 which spindle is mounted in suitable bearings in the casing C. The details of construction of the clutch device D do not form a part of this invention and are therefore not set forth specifically. It suffices to state that there is mounted in the worm compartment of the casing C an arm 21 shiftable in a manner to be shortly described, whereby to release the clutch device D permitting the expansive elements of said device to open and thereby operatively connect the worm wheel 18 with said sleeve 19, and assuming that the motor has been previously started as is made necessary according to this invention, the action of the clutch device being in the manner stated will cause movement to be imparted from the motor through the worm wheel 18 to said sleeve 19.

*Clutch operating bar.*

The arm 21 for engaging the clutch D as above described is carried by a shaft 22, see Figures 9 and 15, and said shaft extends from the worm wheel compartment of the casing C through the partition 15 into the switch compartment of said casing. Fixed to the end of the shaft 22 opposite that to which the arm 21 is fixed, is an angle lever 23 to the lateral arm of which, see Figure 3, is pivotally connected the actuating rod 24 which rides upwardly from the casing C into the casing of the accounting machine and is connected at its upper end with the lower portion of the clutch bar 25. The clutch bar is preferably though not necessarily located at the right side of the keyboard of the accounting machine and is adapted to be depressed to rock the lever 23 downwards, thereby rocking the shaft 22 and moving the arm 21 into a position permitting opening of the clutch device D and the operative connection of the motor B, previously started, with the main shaft or prime mover 14 of the accounting machine.

*Drive from motor to accounting machine main shaft.*

The manner in which the motor actuates the worm, and turns the sleeve 19 when the clutch device D establishes a driving relation between these parts has been set forth. There is mounted on the sleeve 19, see Figure 9, a cam 26 adapted to turn with the sleeve when the latter is clutched to the worm gear 18 and said cam engages a roller 27 on an arm 28 which arm is mounted on the shaft 29, see Figure 4. The shaft 29 extends from the worm wheel compartment of the casing C, in which its arm 28 is disposed, to the switch compartment of said casing, and in the latter there is secured to the shaft 29 the actuating arm 30. The arm 30 is connected by a link 31 and other parts to be later set forth in detail, whereby said arm is adapted when moved to correspondingly move the main shaft 14 of the accounting machine. For present purposes of this description the link 31 may be considered as directly and rigidly connected with the main shaft 14 of the accounting machine, though actually the connection is a safety or yielding connection, and under normal conditions each time the cam 26 is revolved, a downward pull will be exerted on the link 31, and rocking of the main shaft 14 of the acounting machine will be effected substantially in the same manner as if said shaft were rocked by operation of the ordinary crank handle provided therein in a crank handle type of machine. The actuating movement of the shaft 14 from the cam 26 is of course relieved at a predetermined point in the revolution of the cam 26, and the normalizing or restoring spring or springs 32 which are connected with the main shaft 14 will restore said shaft and the accounting mechanism operable thereby.

*The motor controlling switch.*

Located in the switch or right hand compartment of the casing C is the controlling switch lever 33 by which current is supplied to the motor B to drive the latter. The switch lever 33 is constructed as shown clearly in Figures 11 to 13 of the drawings, and is virtually a knife switch adapted to engage its contact plate 34 between the co-operative contact plates 35 mounted stationarily on the bottom of the casing C. Normally the switch lever 33 is in the open or upraised position shown in Figure 6, being held in such position by means to be shortly described, and on dropping of the lever to switch closing position the motor B starts to operate in the well known manner, thereby driving the worm wheel 18 and making possible the operative connection of the drive mechanism with the main shaft of the machine through the actuation of the clutch bar 25 in the manner previously generally set forth.

*Switch controlling mechanism.*

As before premised herein, it is contemplated that there shall always be compelled a clearing operation of the accounting machine as an incident to the starting of the motor B, thus insuring that at the commencement of use of the accounting machine by an operator the accumulator of said machine will be at normal or zeroized. With the foregoing in view, the starting of the motor B is controlled by the clearing and total keys 8 and 3, or both of them. Figure 17 shows the total key 3 as having a stud 3' engageable with the upper arm of an angle lever 36, the front extremity of the lower arm of which lever 36 is arranged above a lateral pin or stud 37 on a vertically disposed operating rod 38 which is seen best in Figures 3 and 4. At its lower end the rod 38 is pivotally connected with the three-armed lever 39, the lateral arm of said lever being attached to the rod 38 and the lowermost arm 39' of said lever having a hook engaging beneath a lug 40 formed on the switch lever 33, the hook 39' supporting the switch lever in its open position, with the motor B dead, under normal conditions.

Depression of the total key 3, therefore, will rock the three-armed lever 39, releasing the switch lever 33 and permitting the latter to move to closed position, thereby starting the motor B, the accounting mechanism being set simultaneously with depression of the key 3 for a totaling or clearing operation and being caused to be cleared by the rocking of the main shaft 14 as an incident to the first depression of the clutch bar 25.

It may be noted that it is impossible to depress the clutch bar 25 and thereby connect the main shaft 14 of the accounting machine operatively with the motor, previous to the depression of the clearing or total key 3. The reason for this is that prior to the depression of the total key, the switch lever 33 is upraised and the uppermost arm 39" of the three-armed lever 39 is so disposed that a lateral lug on said arm is in the path of downward rocking movement of the lever 23 which must rock as an incident to the use of the clutch bar 25. In other words, until the interference established by the lever 39, with respect to downward rocking of the lever 23 by the clutch bar 25, is removed, said clutch bar can not be actuated. With the foregoing arrangement and cooperation of parts in mind it will be obvious that it is impossible to throw the load of the operation of the accounting machine upon the motor when said motor is idle or dead, this being advantageous since the provision referred to necessitates that the motor be started and under way before it has performed the work.

After the motor has been started the operation of the machine involves customarily the depression of one or more of the amount keys of the keyboard, to set up a transaction, and thereafter the clutch bar 25 is depressed to clutch the motor to the main shaft 14 through the driving connections previously set forth. Provision is made by this invention for automatically stopping the motor, once it has been started, and in the event the operator discontinues use of the machine, or in other words ceases to enter transactions thereon. The automatic stopping means is to insure a discontinuance of the use of current for driving the motor when the accounting machine is not being used for its ordinary purposes. In other words the provision is to protect against undue waste of current through the failure of an operator to manually stop the motor, and indefinite unnecessary operation of the machinery.

*Automatic stopping mechanism for motor.*

Fixed on the worm wheel to turn therewith, as seen in Figures 9 and 10, is a cam 41, said cam having a single rotund projection 41' adapted to engage a roller 42 on the arm 43 carried by a short shaft 44 journaled in the partition 15 of a casing C. The shaft 44 projects from the worm wheel compartment of the casing C to the switch compartment, like certain other shafts previously described, and within the switch compartment the shaft 44 carries the feed lever 45. The lever 45 is equipped with a feed pawl 46 engaging a ratchet wheel 47 with which ratchet wheel also engages the detent pawl 48. The ratchet wheel 47 is turnable about an axis member 49, and a hub 47ᵇ of the ratchet wheel is connected by a helical spring 50 with a bushing member 56ˣ also on the member 49, said spring being wound gradually as an incident to turning of the ratchet wheel under the actuation of the feed pawl 46. Each time the worm wheel 18 performs a complete revolution the cam 41 causes rocking of the shaft 44 and the feed lever 45, and likewise causes a certain increment of feeding movement to be imparted to the ratchet wheel 47. On the ratchet wheel 47 is carried a lug 47ᵃ, seen in Figure 6. If the motor B is permitted to continue to operate without any transactions being set up on the accounting machine, and performed as an incident to the customary depressions of the clutch bar 25, at a certain time the operation of the motor will have caused sufficient turning movement of the ratchet 47 to cause the lug 47ᵃ of the latter to engage with the lower side of a lever 51, thereby slightly raising said lever until a coacting hook lever 52, rocked by a spring 53 connecting the parts 51 and 52 engages the lower edge of the lever 51 and locks the latter temporarily in its slightly upraised condition. The rocking of the hook lever 52 in the manner stated elevates the hook 52ᵃ at the lower end of said lever, bringing said hook in the path of a lug 45ᵃ at the uppermost portion of the feed lever 45 and as a result the hook lever 52 is pulled downwards on the next rocking of the lever 45 compelled by the turning of the cam 41 in the manner previously set forth. The pulling down of the hook lever 52 as just set forth raises the switch lever 33 to its open position because the hook lever 52 is pivotally mounted at 54 on the upwardly extending arm of the switch lever. When the switch lever 33 is raised to open position the motor B will stop shortly thereafter. As an incident to the raising and opening movement of the switch lever 33 a cam projection 33ᵃ of said lever engages a stud 55 on a disk 56 which turns on bushing member 56ˣ in a clockwise direction co-axial with respect to the ratchet wheel 47, the turning movement of the disk 56 causing cams 56ᵃ and 56ᵇ thereof to engage pins on the feeding and detent pawls 46 and 48, respectively. In this manner these pawls 46 and 48 are moved out of engagement with the ratchet wheel 47 and the ratchet wheel is permitted to return to a normal or starting position under the influence of the helical spring 50. The automatic stopping of the motor B may be effected at the end of any desired number of movements of the ratchet wheel, dependent of course upon the location of the lug 47ᵃ of said ratchet wheel. This particular feature of construction is the one which times the extent to which the motor may be permitted to operate after the last transaction has been set up on the accounting machine, and further use of said machine discontinued for the time being.

As seen best in dotted lines in Figure 9, a spring 57 is connected with the arm 43 which rocks the shaft 44 and said spring of course tends to move the rear arm of the lever 45 upwards when the cam element of the cam 41 has passed by the roller 42. Thus it is that just succeeding the switch opening movement of the hook lever 52, and incident to actuating momentum of the motor parts, the lug 45ᵃ of the lever 45 engages a cam projection 52ᶜ on the lever 52 and rocks the lever sufficiently to disengage its lug 52ᵇ from the lowermost edge portion of the lever 51, said lug 52ᵇ being thus caused to enter the notched or cut-away portion of the lever 51 permitting the latter to return to its normal position which it occupied previous to the actuation thereof by the projection 47ᵃ. When the lever 51 is thus restored to normal it is ready to be raised again should the operation thereof become necessary owing to discontinuance of use of the machine in the manner hereinbefore described.

*Renewal of period of motor drive action.*

The period of motor drive action for the purposes of this description will be understood as that period prescribed by the controlling operation of the projection 47ᵃ on the ratchet wheel 47. This is a period predetermined in the manner already set forth and under practical conditions becomes useful incident only to the desirability of stopping the motor when the setting up of transactions on the accounting machine has been discontinued a certain length of time. In the ordinary operation of the accounting machine it becomes desirable to negative the effective action of the feeding pawl 46 in respect to the ratchet 47 with a view to renewing the predetermined period of motor drive action in accordance with the operation of the accounting machine. In other words, every time the accounting machine is operated to perform a transaction such operation is made to renew the period of motor drive action by restoring the ratchet wheel 47 to its normal or movement-commencing position. The above operation is effectuated by the provision on the lever 23, see Figures 6 and 9 especially, of a flat lug 23′ which lug is arranged to engage an arm 56ᶜ on the disk 56 previously described. Thus it is that every time the operator sets up an amount on the keys of the accounting machine A and then depresses the clutch bar 25 to connect the already started motor operatively with the shaft 14 of the accounting machine, the depression of the clutch bar causes a downward rocking of the lever 23 and its said lug 23′ engaging the latter with the arm 56ᶜ and rocking the disk 56. The rocking of the disk 56 in this manner causes the cams 56ᵃ and 56ᵇ to be turned, thereby disengaging the pawls 46 and 48 from the ratchet 47 and permitting the spring 50 to restore said ratchet, in the same manner that the spring acts when the part 56 is actuated by the switch lever cam 33ᵃ.

Since the clutch control bar on each depression thereof disengages the pawls 46 and 48 from the ratchet wheel 47, it is obvious that the said wheel 47 will be restored to normal or movement-commencing point every time a transaction is performed on the accounting machine and in this way the predetermined period of motor drive action is intermittently renewed with the intermittent operations of the accounting machine. Under the conditions, therefore, the action of the clutch control bar may be characterized as negativing the effective operation of the ratchet wheel 47, every time said bar 25 is operated.

*Error key motor control.*

According to the operation of the mechanisms as hereinbefore set forth, if the starting key, which is the clearing or total key, either or both as the case may be, is depressed and the clutch control bar 25 actuated, the accounting machine is of course operated to clear the denominationalizer and the totalizer, and the listing mechanism of the machine will print its listing designation indicative of the cleared condition of the machine. The operation of the accounting machine by the motor drive restores the starting or clearing key in the same manner as this takes place as an incident to the operation of the crank handle in the crank handle type of machine. However, the condition presents itself in the use of the motor drive that after the starting key has been depressed the accounting machine may not be operated at all, for some reason or other. As a result, the motor having been started will remain in operation for the predetermined period of motor drive action prescribed by the operation of the lever 51 by the pin 47ᵃ. The coaction between the latter parts will result in automatic stopping of the motor as previously set forth. However, it will be obvious according to the condition aforesaid that there has been no restoration of the starting, clearing or totalizing key and therefore it is necessary that some provision be made to normalize the said starting key in order to subsequently establish electric connection through the switch lever 33 whereby to start the motor in the ordinary way. According to this invention the desired result is accomplished by providing a catch or hook member 58 auxiliary to the hook arm 39' of the lever 39, said hook or detent member 58, actuated by a spring 64, being adapted to engage the lug 40 and thereby uphold the switch lever 33 when said switch lever is opened automatically at the end of the predetermined period of motor drive action. Obviously according to the condition stated the hook member 39' of the lever 39 can not act upon the lug 40 because the starting key is held down and the member 39' inoperative for its normal action on the lever 33.

According to the cooperation of the special control keys of the keyboard the error key 5 is adapted as usual to be depressed to release the special keys, any one of which may have been depressed. This coaction is relied upon in the present instance for the restoration of the starting key 3. The upward movement of said key 3, when released by depression of the error key, permits a rocking of the lever 39 under the action of a spring 59, see Figure 6, one end of which spring is connected with a stud 60 and the other end with the arm 39'' of the lever 39. The rocking of the lever 39 in the manner described, by the spring 59 causes a bent over projection 39ᵃ of the arm 39'' to engage against the upper end of the detent or hook lever 58, thus tilting the hook 58' at its lower end from beneath the projection 40 of the switch lever 33. The hook 58' is slightly higher than the hook 39' so that as the levers 39 and 58 are rocked as described the lug 40 moves off of the hook 58' on to the hook 39'. In this way the key 3 is normalized and the switch lever 33 restored to its normal relation of being supported by the member 39 and ready to be dropped on depressing of the key 3 to start the motor.

A spring 61 is connected also with the stud 60 and with an arm of the lever 23, and tends to raise the rod 24 and hold the clutch control bar 25 in its normal operative position. The downward or closing movement of the switch lever 33 is facilitated by using a spring 62 connecting with the vertical arm of said lever. Likewise the engaging action of the pawls 46 and 48 with respect to the ratchet wheel 47 is facilitated by a spring 63 connecting these pawls together.

The spring 59 above described is of greater strength than the spring 64 which connects the levers 39 and 58, the purpose of this construction being to insure the restoration of the starting key 3 in the manner previously set forth when the error key 5 is actuated. The height of the hook 58' prevents it from passing under the projection 40 when the hook 39' is moved from beneath the part 40.

*Safety connection between motor and accounting machine main shaft.*

Referring especially to Figures 3, 8 and 9, it will be observed that there is rigidly mounted upon the main shaft 14 an arm 65 having a toggle member 66 pivoted at an end thereto, the opposite end of the toggle member being connected by means of a link 67 with the lever 68 which is loosely mounted on the shaft 14. The connection 69 between the link 67 and lever 68 is adjustable in an arcuate slot 70 in one end of the lever whereby said connection may be positioned at different distances from the center of the shaft 14. The purpose of the adjustment of the connection 69 is to vary the resistance incident to the operation of the toggle connection, or in other words vary the toggle breaking point, so to speak, as will appear clearly hereinafter. Rigid with the arm 65 is an arm 71 which with the arm 65 is rigid on the shaft 14, said arm 71 having connected thereto the restoring spring 32 which is a main restoring spring for the main shaft of the accounting machine. Said spring 32 acts through the toggle connecting means just set forth to maintain the roller 27 of the arm 28 in proper positive engagement with the cam 26, all in such a manner as to hold the cam against possibility of back lash. The last mentioned function is subserved owing to the peculiar formation of a dwell in the cam 26, shown clearly in Figure 19, the roller 27 being illustrated as seated in said dwell, according to Figure 9.

Should the accounting machine devices become locked, for any reason, such that they will not work, thereby preventing operation of the shaft 14 it will be evident that the arm 65 will remain stationary, being fixed to the shaft, but the downward pull on the link 31 which connects with the lever 68 is caused as usual, thereby rocking the lever 68 and causing said lever through the link 67 to rock the toggle member 66 downwards against the tension of the spring 73. The toggle member 66 is formed with a curved surface at its inner portion normally bearing against the hub element upon the shaft 14, which hub element carries the member 65. With the foregoing in view, the manner in which the leverage power exerted by the lever 68 on the toggle member 66 for breaking the toggle joint connection between the parts 65 and 68 may be regulated by shifting of the adjustable connection 69, as evident.

*Clutch bar and special keys cooperation.*

Reference is made to Figures 2, 3 and 20, the last figure especially. It is contemplated that a proper action of the special keys 3, 4, 5 and 6, which control total, sub-total, correction, and eliminating operations, respectively, shall be insured by means intermediate these keys and the clutch controller or bar 25. By such means actuation of the keys mentioned, when the clutch bar 25 is not at its normal position, is prevented.

The bar 25 is loosely supported on extensions of levers 76 and 77 pivoted on fixed studs 78. These levers 76 and 77 are loosely riveted together at 79, the looseness being afforded by the rivet operating in an elongated opening of one of the levers. The key 3 has a projection 3′ which is arranged to engage the extension 76ª of the lever 76 when this lever is rocked slightly on depression of the bar 25, under which condition the key 3 is not depressible. With the bar 25 up in its normal position the projection 3′ is free to pass the extension 76ª in an obvious manner. Similarly, the lever 77 has an extension 77ª cooperative with a stud 4ª on the sub-total key 4 to prevent actuation of said key when the bar 25 is down, and permit actuation when the bar is at normal. The rod or bar 24 has a lug 24′ below its point of connection with the bar 25, and said lug is engageable by a lug 80′ on an angle lever 80. The front arm of the lever 80 is below a stud 5ª on the key 5 so that depression of the key tilts the lever 80 so as to cause its lug 80′ to move beneath the lug 24′, thus preventing depression of the clutch bar 25. On the other hand whilst the key 5 is at normal a spring 81 maintains the lever 80 in a position such that the lug 80′ is not in a movement obstructing position relative to the lug 24′, and members 24 and 25. Figure 20 clearly shows the locking slide 82 which is moved downward incident to depression of the non-add or eliminating key 6, according to known construction and operation. The slide 82 has a lug 82′ and the lever 76 likewise has a lug 76ᵇ on its extension 76ª. When the clutch bar 25 is depressed it is evident that the lug 76ᵇ is carried beneath the lug 82′ and lowering of the slide 82 or depression of its actuating key 6 prevented. The interference between the parts 82′ and 76ᵇ is not had when the bar 25 is at normal and the key 6 depressed.

From the foregoing it is apparent that actuation of the special control keys of the keyboard cannot be effected while the control device 25 is depressed.

In reference to the term "starting key" as used hereinbefore, it is to be understood that this term is employed in a broad sense as directed to a starting device generally whether in key form or in some other form. Likewise the term "switch" as employed herein is designed to cover any equivalent contrivance whereby a motor, electrical or mechanical, is started or stopped. In respect to the lever 45, having in view the functioning of this member it may be well termed a "switch opener".

Having thus described my invention, what I claim as new is:

1. In combination, an accounting machine and its main actuator, a motor, a driving connection between the motor and actuator comprising a clutch, a starting key for the motor, a motor switch adapted to be closed by said key, a lever to connect the switch and key, a clutch controller normally locked against effective operation by said lever while the switch is in an open position, a switch opener operable by the motor, and automatic means to connect the opener with the switch.

2. In combination, an accounting machine and its main actuator, a motor, a driving connection between the motor and actuator comprising a clutch, a starting key for the motor, a motor switch adapted to be closed by said key, a lever to connect the switch and key, a clutch controller normally locked against effective operation by said lever while the switch is in an open position, a switch opener positively operable by the motor to open the switch, and automatic means to connect the opener with the switch, effective action of which is preventable by the clutch controller.

3. In combination, an accounting machine and its main actuator, a motor, a driving connection between the motor and actuator comprising a clutch, a starting key for the motor, a motor switch adapted to be closed by said key, a lever to connect the switch and key, a clutch controller normally locked against effective operation by said lever while the switch is in an open position, a switch opener operable by the motor, and automatic means to connect the opener with the switch advanced intermittently from the motor, the last means including an element actuated by the clutch controller to prevent the intermittent advancement of said automatic means.

4. In combination, an accounting machine and its main actuator, a motor, a driving connection between the motor and actuator comprising a clutch, a starting key for the motor, a motor switch adapted to be closed by said key, a switch opener operable by the motor to open the switch, and automatic means to connect the opener with the switch.

5. In combination, an accounting machine and its main actuator, a motor, a driving connection between the motor and actuator comprising a clutch, a starting key for the motor, a motor switch adapted to be closed by said key, a switch opener operable by the motor to open the switch, and automatic means to connect the opener with the switch, effective action of which is preventable by the clutch controller.

6. In combination, an accounting machine and its main actuator, a motor, a driving connection between the motor and actuator comprising a clutch, a starting key for the motor, a motor switch adapted to be closed by said key, a switch opener operable by the motor, and automatic means to connect the opener with the switch after the motor has been in operation a certain period of time.

7. In combination, an accounting machine, an operating motor therefor, means to start the motor, and clearing control mechanism for the accounting machine operated as a necessary incident to operation of said starting means.

8. In combination, an accounting machine, an operating motor therefor, means to start the motor, and total taking mechanism for the accounting machine operated as a necessary incident to the operation of said starting means.

9. In combination, an accounting machine, an operating motor therefor, means to start the motor, and clearing and total taking instrumentalities for the accounting machine operated as a necessary incident to the operation of said starting means.

10. In combination, an accounting machine and its main actuator, a motor, a driving connection between the motor and actuator, a starting key for said motor, automatic means to stop the motor after it has run a predeterminate time, means maintaining the starting key inoperative to start the motor on certain operation of said automatic means, and a special operating device to restore the starting key to operative position.

11. In combination, an accounting machine and its main actuator, a motor, a driving connection between the motor and actuator, a starting key for said motor operable to effect clearing and total taking of the accounting machine, automatic means to stop the motor after it has run a predeterminate time, means to maintain the starting key inoperative to start the motor when operation of said automatic means takes place, and a special operating device to normalize the starting key comprising a correction key for the accounting machine.

12. In combination, an accounting machine and its main actuator, a motor, a driving connection between the motor and actuator, a starting key for said motor, automatic means to stop the motor after it has run a predeterminate time, and means to maintain the starting key in an inoperative position on effective operation of said automatic means under certain conditions, said starting key forming a clearing control means for the accounting machine.

13. In combination, an accounting machine and its main actuator, a motor, a driving connection between the motor and actuator, a starting key for said motor, automatic means to stop the motor after it has run a predeterminate time, means to maintain the starting key in an inoperative position when operation of said automatic means takes place, said starting key forming a clearing control means for the accounting machine, means to restore said key incident to operation of the accounting machine, and a special operating device to restore the starting key after action of said automatic stop means when not preceded by an operation of the accounting machine.

14. In combination, an accounting machine and its main actuator, a motor, a driving connection between the motor and actuator, a starting key for said motor, automatic means to stop the motor after it has run a predeterminate time, means to maintain the starting key in an inoperative position on effective operation of said automatic means under certain conditions, said starting key forming a clearing control means for the accounting machine, and a special operating device to restore the starting key to its motor starting position comprising a correction key for the accounting machine.

15. In combination, an accounting machine and its main actuator, a motor, a driving connection between the motor and actuator, a starting key for said motor, automatic means to stop the motor after it has run a predeterminate time, means to maintain the starting key in an inoperative position on effective operation of said automatic means not preceded by establishment of said driving connection, a clutch between the motor and said main actuator, and means to operate said clutch operable to prevent effective action of said automatic means.

16. In combination, an accounting machine and its main actuator, a motor, a driving connection between the motor and actuator, a starting key for said motor operable to effect clearing and total taking of the accounting machine, means to maintain the starting key inoperative to start the motor when said automatic means operates under certain conditions, a special operating device to normalize the starting key after operation of the stop means, a clutch between the motor and said main actuator, and means to operate said clutch operable to prevent effective action of said automatic means.

17. In combination, an accounting machine and its main actuator, a motor, a driving connection between the motor and actuator, a starting key for said motor, automatic means to stop the motor after it has run a predeterminate time, means to maintain the starting key in an inoperative position during effective operation of said automatic means under certain conditions, said starting key forming a clearing control means for the accounting machine, a special operating device to restore the starting key to motor starting position, a clutch between the motor and said main actuator, and means to operate said clutch operable to prevent effective action of said automatic means.

18. In combination, an accounting machine and a main actuator therefor, a motor adapted for operative connection with said main actuator, and means for starting said motor and compelling a clearing operation of the accounting machine as an incident to the first actuation of said machine after starting of the motor and means to connect the said actuator with the motor.

19. In combination, an accounting machine and a main actuator therefor, a motor adapted for operative connection with said main actuator, and means for starting said motor and compelling a total taking operation of the accounting machine as an incident to the first actuation of said machine after starting of the motor and means to connect the said actuator with the motor.

20. In combination, an accounting machine and its main actuator, a motor, a driving connection between the motor and actuator, a starting key for said motor, means adapted to temporarily hold the starting key in an inoperative position after actuation, automatic means to stop the motor after the elapse of a certain amount of time on failure to establish the driving connection between the motor and the main actuator, and means to restore the starting key adapted to be rendered effective incident to the operation of said automatic means.

21. In combination, an accounting machine and a main actuator therefor, a motor adapted for operative connection with said main actuator, clearing control means for the accounting machine, means to establish said operative connection between the motor and main actuator, and means for starting the motor operable only from said clearing control means, whereby the accounting machine must invariably be cleared before operative connection between the motor and main actuator can be effected.

22. In combination, an accounting machine and a main actuator therefor, a motor adapted for operative connection with said main actuator, total taking control means for the accounting machine, means to establish said operative connection between the motor and main actuator, and means for starting the motor operable only from said total taking control means.

23. In combination, an accounting machine having a main actuator, a motor for driving said main actuator, a switch controlling action and inaction of the motor, a starting key, a member connecting said key with the switch to hold the latter in open position and operable to permit closing of the switch, an automatic device for opening said switch, and a device rendered operable to control the return of the starting key to normal position as an incident to the effective operation of said automatic device.

24. In combination, an accounting machine having a main actuator, a motor for driving said main actuator, a clutch connection intermediate the motor and actuator, a controller for said clutch, a switch controlling action and inaction of the motor, a starting key operable to close said switch, a lever operable by said key and normally holding the switch in open or motor inaction position, and operable to permit closing of the switch, an automatic device for opening the switch after a lapse of a predetermined period of operation of the motor, a detent member for maintaining the switch in an open position when it has been opened by said automatic device, and means for actuating the said detent to restore the cooperation of said lever and switch.

25. In combination, an accounting machine having a main actuator, a motor for driving said main actuator, a clutch connection intermediate the motor and actuator, a controller for said clutch, a switch controlling action and inaction of the motor, a starting key operable to close said switch, a part operable by said key and normally holding the switch in open or motor inaction position, and operable to permit closing of the switch, an automatic device for opening the switch after a lapse of a predetermined period of operation of the motor, a detent member for maintaining the switch in an open position when it has been opened by said automatic device, and a device for actuating the said detent to restore cooperation of the said holding part and switch, and comprising a key of the accounting machine.

26. In combination, an accounting machine having a main actuator, a motor for driving said main actuator, a clutch connection intermediate the motor and actuator, a controller for said clutch, a switch controlling action and inaction of the motor, a starting key operable to close said switch, a lever operable by said key and normally holding the switch in open or motor inaction position and operable to permit closing of the switch, an automatic device for opening the switch after a lapse of a predetermined period of operation of the motor, a detent member for maintaining the switch in an open position when it has been opened by said automatic device, and a member for actuating the said detent to restore cooperation of said lever with the switch and comprising a key of the accounting machine operable to actuate said detent by cooperation with the starting key, the lever connecting the starting key with the switch being adapted to lock the clutch controller against operation when the switch is in an open position.

27. In combination, an accounting machine having a main actuator, a motor for driving said main actuator, a clutch connection intermediate the motor and actuator, a controller for said clutch, a switch controlling action and inaction of the motor, a starting key operable to close said switch, a lever operable by said key and normally holding the switch in open or motor inaction position and operable to permit closing of the switch, an automatic device for opening the switch after a lapse of a predetermined period of operation of the motor, a detent member for maintaining the switch in an open position when it has been opened by said automatic device, means for actuating the said detent to release the switch therefrom and reengage said lever therewith, and comprising a key of the accounting machine operable to actuate said detent by cooperation with the starting key, and an actuating lever operable by the clutch controller for preventing effective operation of said automatic device.

28. In motor drive mechanism for accounting machines, the combination of a motor, a starting switch controlling said motor, a starting key cooperative with said switch to start the motor, automatic means for discontinuing operation of the motor including an intermittently operated ratchet, and a switch opening lever, means intermediate said ratchet and said lever to operatively connect the opening lever with the switch, and means on the switch for normalizing the ratchet means as an incident to the opening of the switch and stoppage of the motor.

29. In motor drive mechanism for accounting machines, the combination of a motor, a starting switch controlling said motor, a starting key cooperative with said switch to start the motor, automatic means for discontinuing operation of the motor after it has been operated a predetermined period of time, including a part intermittently actuated while the motor is running, a ratchet wheel, feeding means for said ratchet wheel operated from said intermittently actuated part, a member for effecting motor stopping action of the switch, and means controlled by a predetermined amount of movement of the ratchet wheel to connect the last mentioned member with the switch.

30. In motor drive mechanism for accounting machines, the combination of a motor, a starting switch controlling said motor, a starting key cooperative with said switch to start the motor, automatic means for discontinuing operation of the motor after it has been operated a predetermined period of time, including a part intermittently actuated while the motor is running, a ratchet wheel, feeding means for said ratchet wheel operated from said intermittently actuated part, a member for effecting motor stopping action of the switch, and means controlled by a predetermined amount of movement of the ratchet wheel to connect the last mentioned member with the switch and then disconnect said member from the switch, the switch being provided with a cam operating on the motor stopping movement of the switch to restore the ratchet wheel to a normal position.

31. In a motor drive mechanism for accounting machines, the combination of a motor, a starting switch controlling said motor, a starting key cooperative with said switch to start the motor, automatic means for discontinuing operation of the motor including an intermittently operated ratchet and a switch opening lever, means intermediate said ratchet and said lever to operatively connect the opening lever with the switch, means on the switch for normalizing the ratchet means as an incident to the opening of the switch and stoppage of the motor, a machine for operation by the motor, a clutch to connect the motor with said machine, a controller for said clutch, and means actuated by the clutch cooperative with said ratchet wheel to normalize the same and prevent motor stopping action of the switch.

32. The combination with an accounting machine comprising registering mechanism and means for articulating said mechanism, of a main actuator for operating the articulating means, a motor, means to connect said motor for driving said main actuator, and clearing means for said registering mechanism cooperative with the motor for starting the same.

33. In an accounting machine, the combination with totalizing mechanism and listing mechanism, means for articulating said mechanism, a main actuator for operating the articulating means, a motor, connecting means for driving said main actuator from said motor, and means for controlling clearing of the totalizing mechanism cooperative with the motor to control starting of the latter.

34. In combination, an accounting machine and its main actuator, a motor, a driving connection between the motor and actuator, a starting key for the motor, and clearing means for the machine controlled from the starting key.

35. In combination, an accounting machine and its main actuator, a motor, a driving connection between the motor and actuator comprising a clutch, a starting key for the motor, a clutch controller, an interlock preventing effective operation of said controller prior to motor starting actuation of the starting key, and means to prevent subsequent operation of the starting key when the said controller is in operated position.

36. In combination, an accounting machine and its main actuator, a motor, a driving connection between the motor and actuator comprising a clutch, a starting key for the motor, a clutch controller, means to prevent operation of the controller previous to starting of said motor, clearing means for the machine controlled from the starting key, and means to prevent subsequent operation of the starting key when the said controller is in operated position.

37. In combination, an accounting machine and its main actuator, a motor, a driving connection between the motor and actuator comprising a clutch, a starting key for the motor, a clutch controller, means to prevent operation of the controller previous to starting of said motor, an eliminating key for effecting special operations of the accounting machine, and means whereby said eliminating key cannot be operated when the clutch controller is in its effective controlling position.

38. In combination, an accounting machine and its main actuator, a motor, a driving connection between the motor and actuator comprising a clutch, a controller for said clutch whereby the accounting machine may be connected and disconnected relatively to the motor, a total control key for said machine, and means to prevent operation of said key when the said controller is not in its normal position.

39. In combination, an accounting machine and its main actuator, a motor, a driving connection between the motor and actuator comprising a clutch, a controller for said clutch whereby the accounting machine may be connected and disconnected relatively to the motor, an eliminating control key for said machine, and means to prevent operation of said key when the said controller is not in its normal position.

40. In combination, an accounting machine and its main actuator, a motor, a driving connection between the motor and actuator comprising a clutch, a controller for said clutch whereby the accounting machine may be connected and disconnected relatively to the motor, special operation control keys for the accounting machine, and levers connected with the clutch controller and operable thereby to govern the action of said control keys.

41. In combination, an accounting machine and its main actuator, a motor, a driving connection between the motor and actuator comprising a clutch, a controller for said clutch whereby the accounting machine may be connected and disconnected relatively to the motor, special operation control keys for the accounting machine, and levers connected with the clutch controller and having members to engage the said control keys to prevent actuation of the latter when the controller is in a predetermined position.

42. In combination, a registering machine, motor drive mechanism therefor comprising a motor, a starting key for said motor, a controller for operatively connecting the motor and the registering machine, a switch controlled by said starting key whereby to start the motor, automatic means controlled by the said controller for opening the switch after a predetermined period of inactivity of said controller elapses, a hook part engaging the switch and shiftable by the starting key to permit closing of the switch, and an auxiliary hook part adapted to engage the switch to hold the same open when the first mentioned part is prevented from so doing by maintenance of the starting key in starting position.

43. In combination, a registering machine, motor drive mechanism therefor comprising a motor, a starting key for said motor, a controller for operatively connecting the motor and the registering machine, a switch controlled by said starting key whereby to start the motor, automatic means controlled by the said controller for opening the switch after a predetermined period of inactivity of said controller elapses, a hook part engaging the switch and shiftable by the starting key to permit closing of the switch, an auxiliary hook part adapted to engage the switch to hold the same open when the first mentioned part is prevented from so doing by maintenance of the starting key in starting position, a key operable to cause restoration action of the starting key, and means operable from the first mentioned hook part for shifting the same into engagement with the open switch and disengaging the auxiliary hook part from said switch on restoration of said starting key.

44. In combination, an accounting machine having an actuator, a motor adapted to operate the actuator, means to start the motor comprising a switch, a starting key to render the switch active, and control means to automatically stop the motor by rendering the switch inactive, including a step by step device driven by the motor, and a part to render the switch inactive, effective after a certain number of step by step movements of the step by step device, and means to permit normalizing of the step by step device coincident with the rendering inactive of said switch.

45. In combination, an accounting machine having an actuator, a motor adapted to operate the actuator, means to start the motor comprising a switch, a starting key to render the switch active, and control means to automatically stop the motor by rendering the switch inactive, including a step by step device driven by the motor, and a part to render the switch inactive effective after a certain number of step by step movements of the step by step device, and means operated from the switch to permit normalizing of the step by step device coincident with the rendering inactive of said switch.

46. In combination, an accounting machine having an actuator, a motor adapted to operate the actuator, means to start the motor comprising a switch, a starting key to render the switch active, control means to automatically stop the motor by rendering the switch inactive, including a step by step device driven by the motor, a part to render the switch inactive effective after a certain number of step by step movements of the step by step device, means operated from the switch to permit normalizing of the step by step device coincident with the rendering inactive of said switch, and a spring to cause the normalization of the step by step device.

In testimony whereof I affix my signature.

AMOS H. HAWLEY.